United States Patent [19]

Lin

[11] Patent Number: 5,549,017

[45] Date of Patent: Aug. 27, 1996

[54] BRAKE LEVER FOR MOTORCYCLE

[76] Inventor: Frank Lin, No. 377, Sec 1, Changmei Road, Changhua, Taiwan

[21] Appl. No.: 254,952

[22] Filed: Jun. 7, 1994

[51] Int. Cl.$^6$ ....................................... G05G 1/04
[52] U.S. Cl. ........................ 74/558.5; 74/502.2; 74/489
[58] Field of Search .................................. 74/502.2, 489, 74/558.5; 359/520, 521, 534, 536; D12/114

[56] References Cited

U.S. PATENT DOCUMENTS 5,123,296  6/1992  Chang .............................. 74/588.5 X Primary Examiner—Charles A. Marmor
Assistant Examiner—Chong H. Kim
Attorney, Agent, or Firm—Merchant, Gould, Smith, Edell, Welter & Schmidt, P.A.

[57] ABSTRACT

An improved brake lever includes a lever body, a protective strip and a cap. The lever body is provided with a longitudinal slot which has a narrowed slit merged into the lever body at both ends of the longitudinal slot. The protective strip can be readily received and retained with the longitudinal slot. The end portion of the lever body has a flat portion which is provided with a dowel hole. The dowel hole has a narrowed inlet. The bottom side of the cap is incorporated with a bead. By this arrangement, the bead of the cap can be readily received and retained by the dowel hole. Accordingly, a compact and firm engagement is ensured between the cap and the lever body. Consequently, an improved brake lever with above described advantages is achieved.

2 Claims, 1 Drawing Sheet

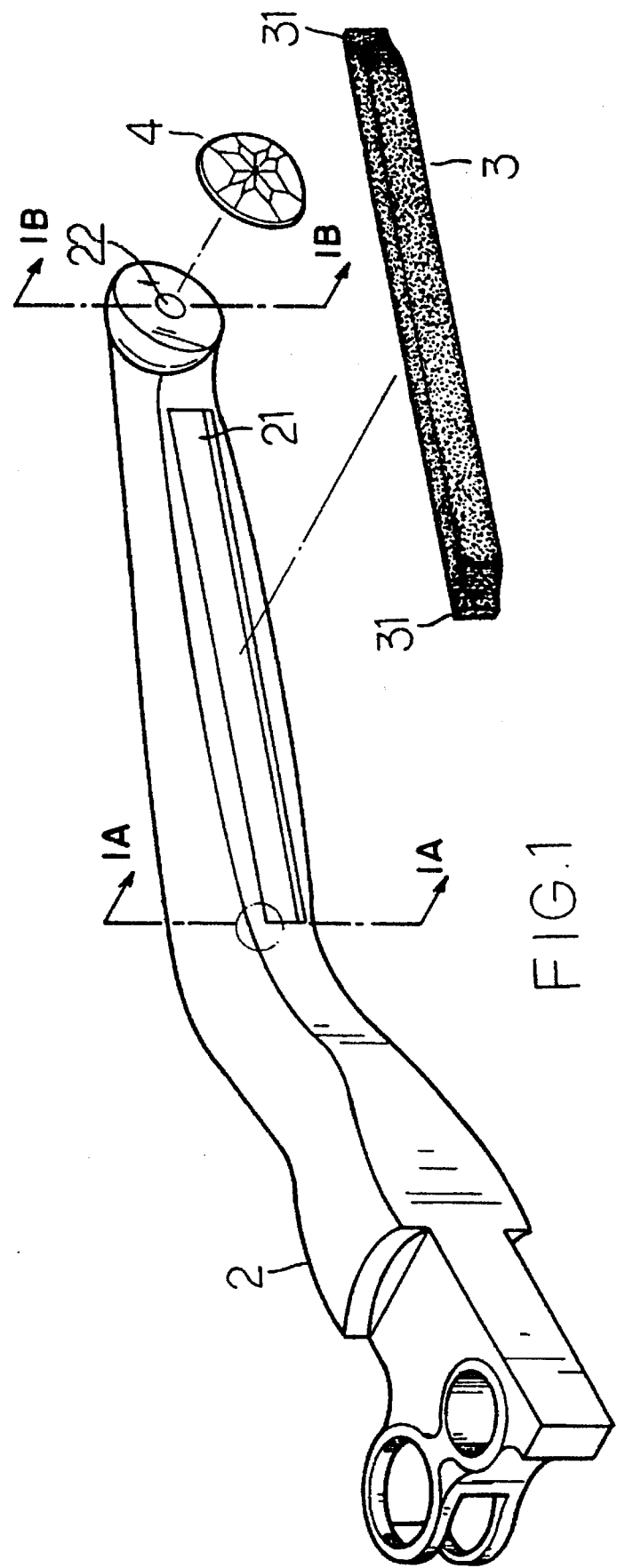
FIG.1
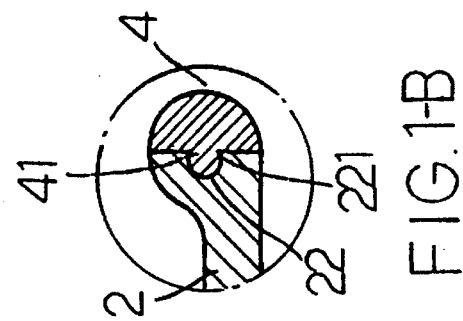
FIG.1B
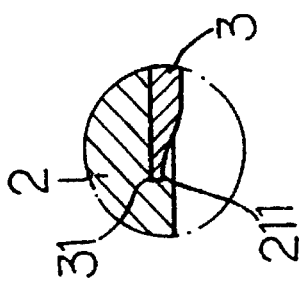
FIG.1-A

BRAKE LEVER FOR MOTORCYCLE

BACKGROUND OF THE INVENTION

This invention relates to an improved brake lever for motorcycle. This improved brake lever includes a lever body, a protective strip and a cap. The protective strip is incorporated with a rough surface which provides an excellent frictional grasp for the hand. Besides, the protective strip and cap are made from reflective (fluorescent) material which can be easily seen by other driver when the brake lever is spotted by the headlamp of other vehicle. Accordingly, a smooth, convenient and utmost safe riding can be ensured.

The conventional brake lever is made from pressing mold and the molded brake lever is provided with a smooth surface in later treatment. Since the climate here is hot and humid, our hand tends to sweat, accordingly, the sweated hand may easily slip over from the brake lever. A great inconvenience may occur and the riding safety may also be negatively influenced.

Since the motorcycle are the main transportation for most of the white collars and salesmen for its convenient and mobility. There are a great demand of the market, in light of this, it is necessary to provide an improved brake lever which can completely solve the problem which the conventional bake lever met.

SUMMARY OF THE INVENTION

It is the object of this invention to provide an improved brake lever. This improved brake lever includes a lever body, a protective strip and a cap. The lever body is provided with a longitudinal slot which has a narrowed slit merged into the lever body at both ends. The protective strip can be readily received and retained with the longitudinal slot. The end portion of the lever body has a flat portion which is provided with a dowel hole. The dowel hole has a narrowed inlet. The bottom side of the caps is incorporated with a bead. By this arrangement, the bead of the cap can be readily received and retained by the dowel hole. Accordingly, a compact and firm engagement is ensured between the cap and the lever body. Consequently, an improved brake lever with above described advantages is achieved.

In a preferred embodiment of the improved brake lever made according to this invention, the protective strip and the cap are made from reflective (fluorescent) material which can be readily seen by other driver when the brake lever is spotted by the headlamp of the coming vehicle.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of an improved brake lever. In the drawings:

FIG. 1 is an exploded perspective view of the improved brake lever made according to this invention;

FIG. 1A is a cross sectional view of the improved brake lever taken from 1A—1A line in FIG. 1 when a protective strip is retained in a longitudinal slot of the brake lever; and FIG. 1B is a cross sectional view of the improved brake lever taken from 1B—1B line in FIG. 1.

DETAILED DESCRIPTION OF PREFERRED EMBODIMENT

Referring to FIG. 1, the improved brake lever made according to this invention includes a lever body 2, a protective strip 3 made integrally from plastic material and a plurality of cap 4 made from fluorescent material.

The lever body 2 is provided with a plurality of longitudinal slots 21. The end of the slot 21 is merged into the lever body 2 in a slit 211. On the other hand, the ball portion of the brake lever which is bent outward is provided dowel hole 22. On the other hand, this dowel hole 22 has a narrowed inlet 221. The protective strip 3 is made with a configuration in such a manner that the protective strip 3 can be readily received by said longitudinal slot 3. On the other hand, the protective strip 3 is made to have a thinner ends 31 which can be received and retained by said slit 211, as clearly shown in FIG. 1A. By this arrangement, the protective strip 3 can be retained within the slot 21.

On the other hand, the bottom side of the cap 4 is provided with a bead 41. The outer diameter of the bead 41 is slightly larger than the inlet 221 of the dowel hole 22. Accordingly, when the bead 41 is pressed and retained into the dowel hole 22, the cap 4 will be firmly retained thereof, as clearly shown in FIG. 1B.

For a better effect, the protective strip 3 and the cap 4 can be made from reflective (fluorescent) material which make it be clearly seen by other driver which the brake lever is spotted by the headlamp of the coming vehicle. On the other hand, the protective strip 3 provides a frictional grasp for the hand, hence, a safe riding is ensured.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claim.

I claim:

1. An improved brake lever including a lever body, a protective strip and a cap, said lever body being provided with a longitudinal slot which has a narrowed slit merged into the lever body at both ends of the longitudinal slot, said protective strip being configured in such a manner that said protective strip is received and retained with said longitudinal slot, said protective strip including at least one thinner end portion which is received and retained within at least one of said slits, an end portion of the lever body having a flat portion which is provided with a dowel hole which has a narrowed inlet, a bottom side of said cap being incorporated with a bead which is received within said dowel hole.

2. An improved brake lever as recited in claim 1, wherein the protective strip and said cap are made from reflective material to make said protective strip and said cap be clearly seen when spotted by a headlamp of a coming vehicle.

* * * * *

UNITED STATES PATENT AND TRADEMARK OFFICE
CERTIFICATE OF CORRECTION

PATENT NO. : 5,549,017
DATED : August 27, 1996
INVENTOR(S) : Frank Lin

It is certified that error appears in the above-indentified patent and that said Letters Patent is hereby corrected as shown below:

column 1, line 61, "1A" should read --2-- column 1, line 62, "1A-1A" should read --2-2-- column 2, line 1 "1B" should read --3-- column 2, line 2 "1B-1B" should read --3-3-- line 16, column 2, line 2, insert --when a cap is retained in a dowel hole of the brake lever-- after the word "Fig.1"

column 2, line 23, "1A" should read --2-- column 2, line 30, "1B" should read --3--

Signed and Sealed this

Eighteenth Day of March, 1997

Attest:

BRUCE LEHMAN

*Attesting Officer*      *Commissioner of Patents and Trademarks*